(12) United States Patent
Na et al.

(10) Patent No.: US 9,726,811 B2
(45) Date of Patent: Aug. 8, 2017

(54) CIRCUIT BOARD AND LIGHTING DEVICE HAVING THE CIRCUIT BOARD

(71) Applicant: LG INNOTEK CO., LTD., Seoul (KR)

(72) Inventors: Se Woong Na, Seoul (KR); Min Jae Kim, Seoul (KR); Bi Yi Kim, Seoul (KR); Hyun Gyu Park, Seoul (KR); In Hee Cho, Seoul (KR); Man Hue Choi, Seoul (KR); Seung Kwon Hong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 324 days.

(21) Appl. No.: 14/290,519

(22) Filed: May 29, 2014

(65) Prior Publication Data

US 2014/0376265 A1    Dec. 25, 2014

(30) Foreign Application Priority Data

Jun. 24, 2013 (KR) .......................... 10-2013-0072375

(51) Int. Cl.
*F21V 8/00* (2006.01)
*F21V 15/00* (2015.01)

(52) U.S. Cl.
CPC ............ *G02B 6/0081* (2013.01); *F21V 15/00* (2013.01); *G02B 6/0091* (2013.01); *G02B 6/0093* (2013.01)

(58) Field of Classification Search
CPC .. G02B 6/0081; G02B 6/0091; G02B 6/0093; F21V 15/00; F21V 13/00
See application file for complete search history.

(56) References Cited

U.S. PATENT DOCUMENTS

| | | | |
|---|---|---|---|
| 2010/0290248 A1* | 11/2010 | Park | G02B 6/0091 362/606 |
| 2012/0039090 A1 | 2/2012 | Jiang et al. | |
| 2012/0182759 A1 | 7/2012 | Kokusho | |
| 2012/0293728 A1 | 11/2012 | Yokohama | |
| 2013/0063679 A1 | 3/2013 | Tang | |
| 2013/0070479 A1 | 3/2013 | Ito | |

FOREIGN PATENT DOCUMENTS

WO     WO-2013/046560 A1     4/2013

OTHER PUBLICATIONS

European Search Report in European Application No. EP-14169736.7 dated Nov. 6, 2014.

* cited by examiner

*Primary Examiner* — Stephen F Husar
(74) *Attorney, Agent, or Firm* — Saliwanchik, Lloyd & Eisenschenk

(57) ABSTRACT

Provided is a circuit board including: a support substrate; a plurality of light emitting devices mounted on the support substrate; and a device protection portion surrounding one of the light emitting devices, or three or more surfaces of the plurality of light emitting devices.

16 Claims, 7 Drawing Sheets

CIRCUIT BOARD AND LIGHTING DEVICE HAVING THE CIRCUIT BOARD

CROSS-REFERENCE TO RELATED APPLICATION

This application claims the benefit under 35 U.S.C. §119 of Korean Patent Application No. 10-2013-0072375, filed Jun. 24, 2013, which is hereby incorporated by reference in its entirety.

BACKGROUND

Field of the Invention

Embodiments of the present invention relate to a way for efficiently fixing a circuit board and a light guide plate.

Description of the Related Arts

FIG. 1 is a view illustrating a circuit board and a light guide plate according to a conventional art.

Referring to FIG. 1, the circuit board (i.e. PCB) is configured such that a plurality of light emitting devices 20, such as light emitting diodes (LEDs) is mounted on a support substrate 10. A lighting device may be formed by providing the circuit board and a light guide plate 30 for guiding light of the light emitting devices 20 in the circuit board. When the lighting device is operated, the light guide plate 30 expands due to heat generated from the light emitting devices, and due to this, the light emitting devices are frequently damaged.

Accordingly, ways to protect the light emitting devices from the light guide plate have been practically needed.

BRIEF SUMMARY

An aspect of embodiments of the present invention may provide a circuit board which can protect light emitting devices by preventing a light guide plate and the light emitting devices from coming into contact with each other using a device protection portion in a protruding form.

Another aspect of embodiments of the present invention may provide a circuit board which can effectively protect light emitting devices by forming a surface of a device protection portion protruding to a light guide plate in various shapes, or forming the surface in a stepped structure or in a slope structure.

A further aspect of embodiments of the present invention may provide a circuit board which can protect light emitting devices from a light guide plate by enabling a device protection portion to be stably attached to a support substrate by a binding portion.

Yet another aspect of embodiments of the present invention may provide a circuit board which is configured such that, in a support substrate including a first region and a second region to extend to be bent from the first region, a device protection portion is formed on the support substrate of any one of the regions.

Still another aspect of embodiments of the present invention may provide a circuit board which enables expansion of a device protection portion caused by a light guide plate to be reduced by coating one surface of the device protection portion with at least one material of a resin material, a non-conductive material and a material having lower conductivity than that of the support substrate.

According to an aspect of the embodiments of the present invention, a circuit board may include: a support substrate; light emitting devices on the support substrate; and a device protection portion disposed at the periphery of the light emitting devices so as to prevent a light guide plate diffusing light generated from the light emitting devices from coming into contact with the light emitting devices.

A part of the device protection portion may protrude more than the light emitting devices from the support substrate.

The device protection portion may be formed to surround the light emitting devices.

The device protection portion may be formed to surround the periphery of the multiple light emitting devices.

A surface of the device protection portion protruding to the light guide plate may have any one shape of a straight lined shape, a curved shape, a circular shape, an elliptical shape and a polygonal shape.

The device protection portion may be disposed in a space between the light emitting devices.

The device protection portion may be configured such that a stepped projection is formed on a surface protruding to the light guide plate.

The device protection portion may be configured such that a slope is formed on a surface protruding to the light guide plate.

The device protection portion may further include a binding portion attached to the support plate.

The circuit board may further include an adhesive material portion disposed between the support substrate and the binding portion.

The circuit board may further include a binding hole formed in the support substrate, wherein the binding portion may be attached to the support substrate via the binding hole.

The circuit board may further include a protective layer formed on the device protection portion and containing any one material of a resin material, a non-conductive material and a material having lower conductivity than that of the support substrate.

The support substrate may include: a first region in which the light emitting devices are disposed; a second region extending from the first region; and a bending portion formed between the first region and the second region.

According to another aspect of the embodiments of the present invention, a lighting device may include: a support substrate; light emitting devices on the support substrate; a light guide plate diffusing light generated from the light emitting devices; and a device protection portion disposed at the periphery of the light emitting devices so as to prevent the light guide plate from coming into contact with the light emitting devices.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION

Figure 1:
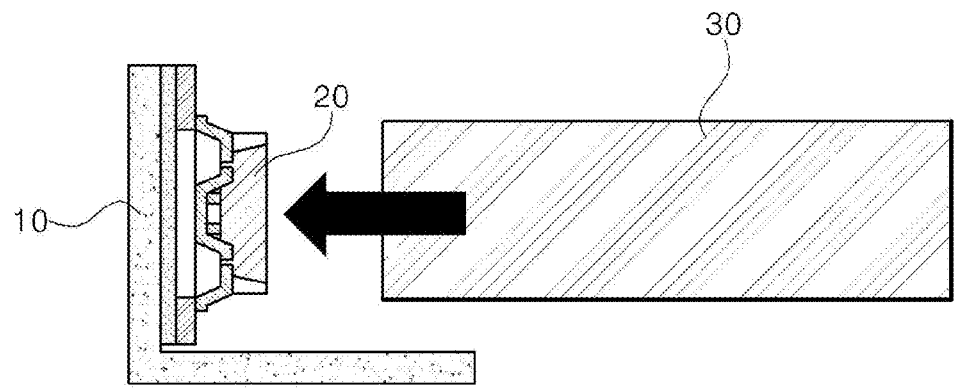
FIG. 1 is a view illustrating a circuit board and a light guide plate according to a conventional art.

Hereinafter, the configurations and operations according to embodiments of the present invention will be described in detail with reference to the accompanying drawings. The present invention may, however, be embodied in different forms and should not be construed as limited to the embodiments set forth herein. In the explanation with reference to the accompanying drawings, regardless of reference numerals of the drawings, like numbers refer to like elements through the specification, and repeated explanation thereon is omitted. Terms such as a first term and a second term may be used for explaining various constitutive elements, but the constitutive elements should not be limited to these terms. These terms is used only for the purpose for distinguishing a constitutive element from other constitutive element.

Figure 2:
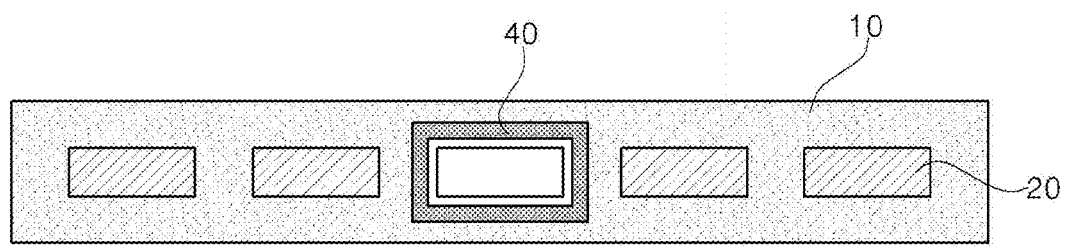
FIGS. 2 and 3 are views illustrating a circuit board according to some embodiments of the present invention.
Figure 3:
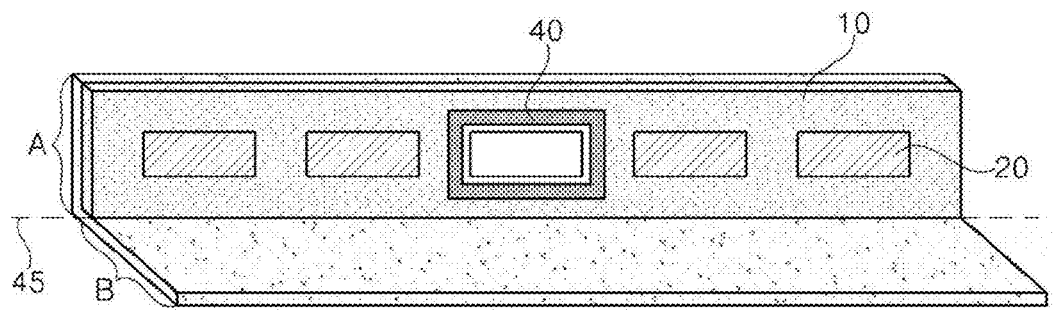

FIGS. 2 and 3 are views illustrating a circuit board according to some embodiments of the present invention Referring to FIGS. 2 and 3, a circuit board includes a support substrate 10, light emitting devices 20, and a device protection portion 40.

The light emitting devices 20 are formed on the support substrate 10.

Also, the device protection portion 40 is disposed at the periphery of the light emitting devices 20, thereby protecting the light emitting devices 20.

Explaining it in greater detail, the device protection portion 40 prevents a light guide plate diffusing light generated from the light emitting devices 20 from coming into contact with the light emitting devices.

According to the present embodiment, as illustrated in FIG. 2, the circuit board may be in a bar form or may be, as illustrated in FIG. 3, in a form which is divided into a first region A and a second region B by a bending portion.

The support substrate 10 is one of basic elements constituting the circuit board, and functions to mount the light emitting devices 20. The support substrate 10 may be formed in a straight lined shape of a bar form. According to an embodiment, the support substrate 10 may be made of at least one of Al, Au, Ag, Cr, an organic material, an inorganic material, a magnetic material and a conductive material.

The height of a part of the device protection portion 40 is formed to protrude greater than a thickness of the light emitting device 20, thereby enabling the light emitting devices 20 to be protected from the light guide plate.

The bending type circuit board of FIG. 3 may include: the support substrate 10 composed of the first region A and the second region B; the bending portion 45 formed between the first region A and the second region B; the light emitting devices 20 formed in the first region A of the support substrate 10; and the device protection portion 40 disposed at the periphery of the light emitting devices 20.

Figure 4:
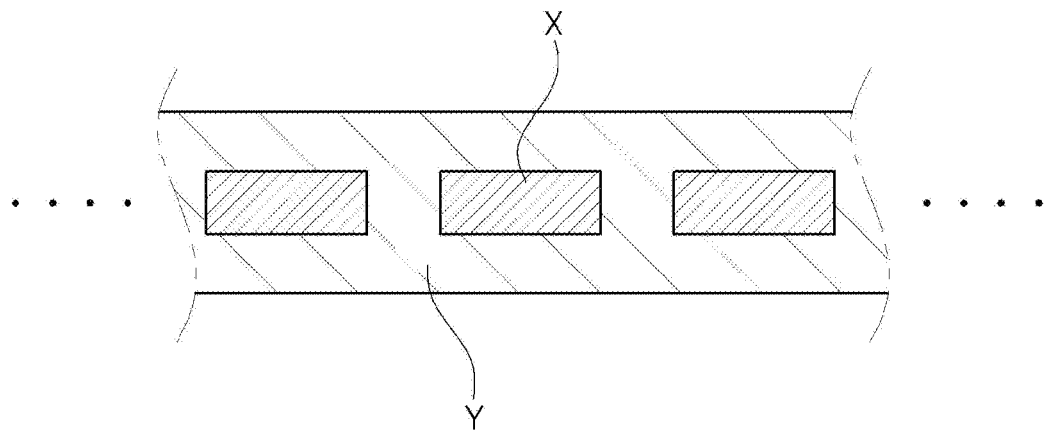
FIG. 4 is a view illustrating one example in which a mounting region and a surplus region of a support substrate are divided.

FIG. 4 is a view illustrating one example in which a mounting region and a surplus region of the support substrate are divided;

Referring to FIG. 4, the support substrate 10 may be divided into a mounting region X to which each of the light emitting devices 20 is mounted, and a surplus region Y which is a remaining region except for the mounting region X. Accordingly, the device protection portion 40 may be formed in the surplus region Y in which the light emitting devices 20 are not mounted in such a manner as not to cover the light emitting devices 20. For example, the device protection portion 40 may be formed to surround one of the light emitting devices 20, or to surround three or more surfaces of the multiple light emitting devices of the surplus region Y.

Accordingly, the device protection portion 40 may be formed of a figure in which the surfaces are connected to each other. That is, the device protection portion 40 may be configured such that a surface protruding to the light guide plate is formed in one shape of a straight lined shape, a curved shape, a circular shape, an elliptical shape and a polygonal shape.

According to an embodiment, the device protection portion 40 may be configured such that widths of the surfaces are formed to be different from each other, edges of the surfaces are formed in at least one shape of a straight lined shape, a curved shape, a circular shape, an elliptical shape and a polygonal shape, or a part protruding in a direction of a light emitting surface of the light emitting devices 20 is formed in a stepped structure or in a slope structure.

FIGS. 5 to 15 are views illustrating the device protection portion according to some embodiments of the present invention.

Figure 5:
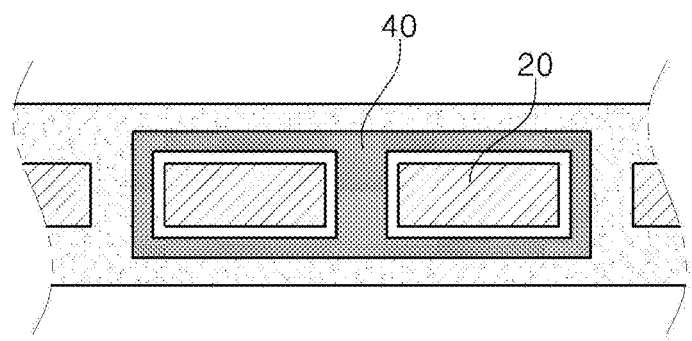
FIGS. 5 to 15 are views illustrating a device protection portion according to some embodiments of the present invention.

Referring to FIGS. 5 to 11, as shown in FIG. 5, the device protection portion 40 may be formed to protrude on a surface surrounding two or more light emitting devices 20. As shown in FIGS. 2 and 3, the device protection portion may surround one light emitting device.

Figure 6:
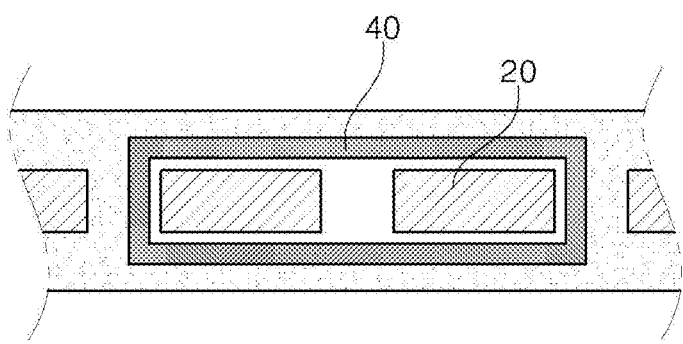

Also, as shown in FIG. 6, the device protection portion 40 may not be formed in a spaced portion between two light emitting devices 20.

Figure 7:
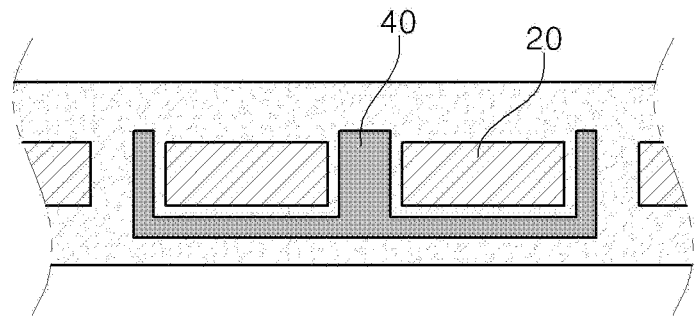
Figure 8:
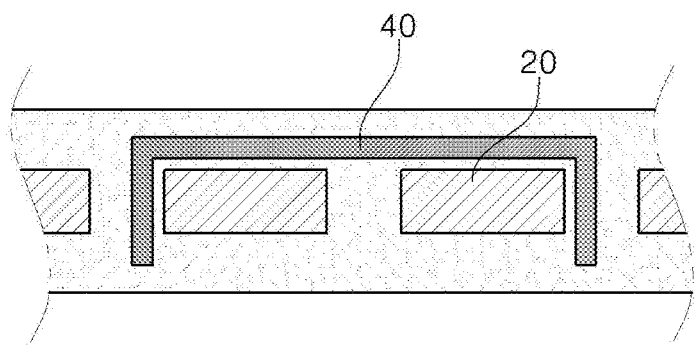

Also, as shown in FIG. 7, the device protection portion 40 may be formed in a spaced portion between the light emitting device and a lower side on the basis of the light emitting device 20. Also, as shown in FIG. 8, the device protection portion 40 may not be formed in a spaced portion between two light emitting devices and a lower side on the basis of the light emitting device 20.

Figure 9:
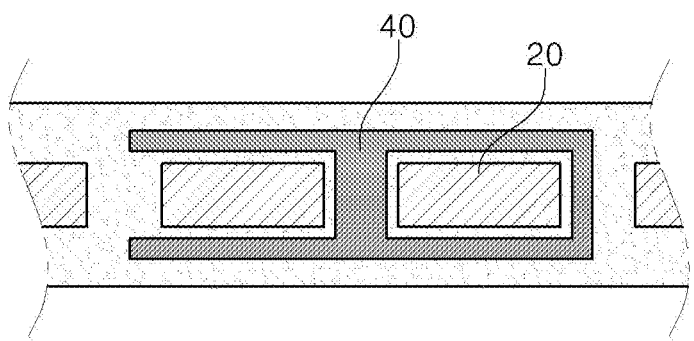
Figure 10:
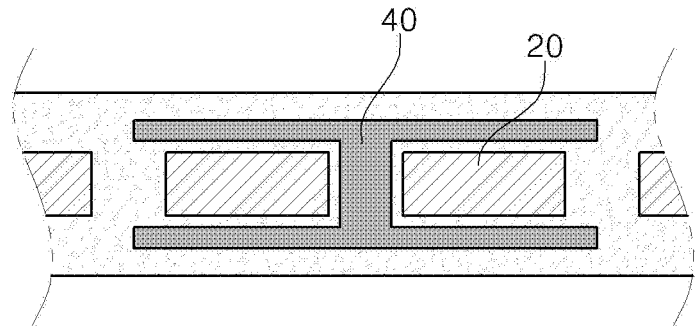
Figure 11:
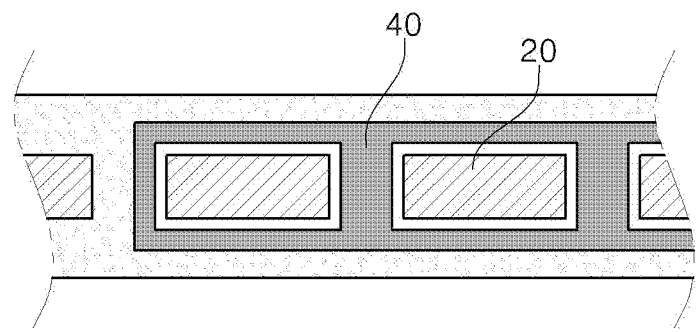

Also, as shown in FIGS. 9 and 10, the device protection portion 40 may be formed in various shapes on a surface surrounding two or more light emitting devices 20. Also, as shown in FIG. 11, the device protection portion 40 may be formed to surround three or more light emitting devices 20.

Figure 12:
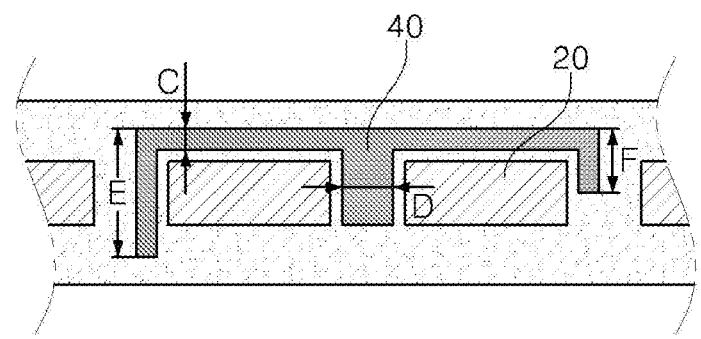

Referring to FIG. 12, the device protection portion 40 may be formed to protrude on a surface surrounding two or more light emitting devices 20, a width C of a surface formed at an upper side on the basis of the light emitting devices and a width D formed at a spaced portion between two light emitting devices may be different from each other, and lengths E, F of longitudinal axes surrounding the light emitting devices may be also formed to be different from each other.

Figure 13:
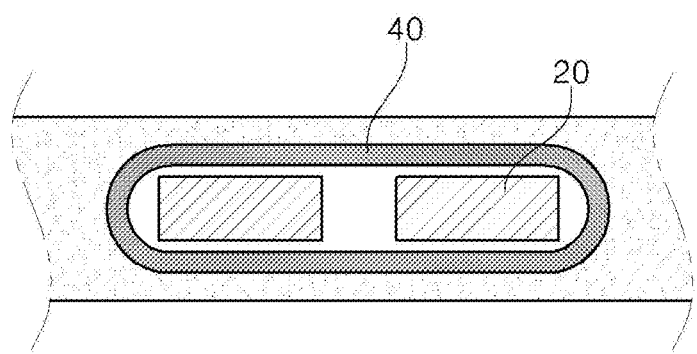

Also, as shown in FIG. 13, the device protection portion 40 may be configured such that surfaces connected to each other are formed in an elliptical shape of a curved form.

Figure 14:
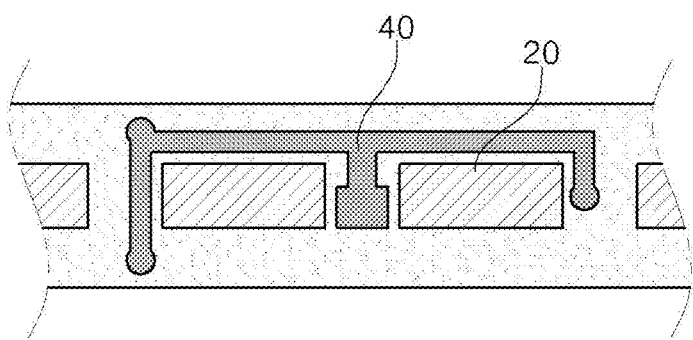

Furthermore, as shown in FIG. 14, the device protection portion 40 may be configured such that an edge of each of the surfaces is formed in at least one shape of a straight lined shape, a curved shape, and a polygonal shape. The edge may refer to an edge or end of each of the surfaces and the edge or end may be formed in a straight lined shape, a curved shape, or various polygonal shapes such as a triangular shape, a quadrangular shape, a circular shape and the like.

Figure 15:
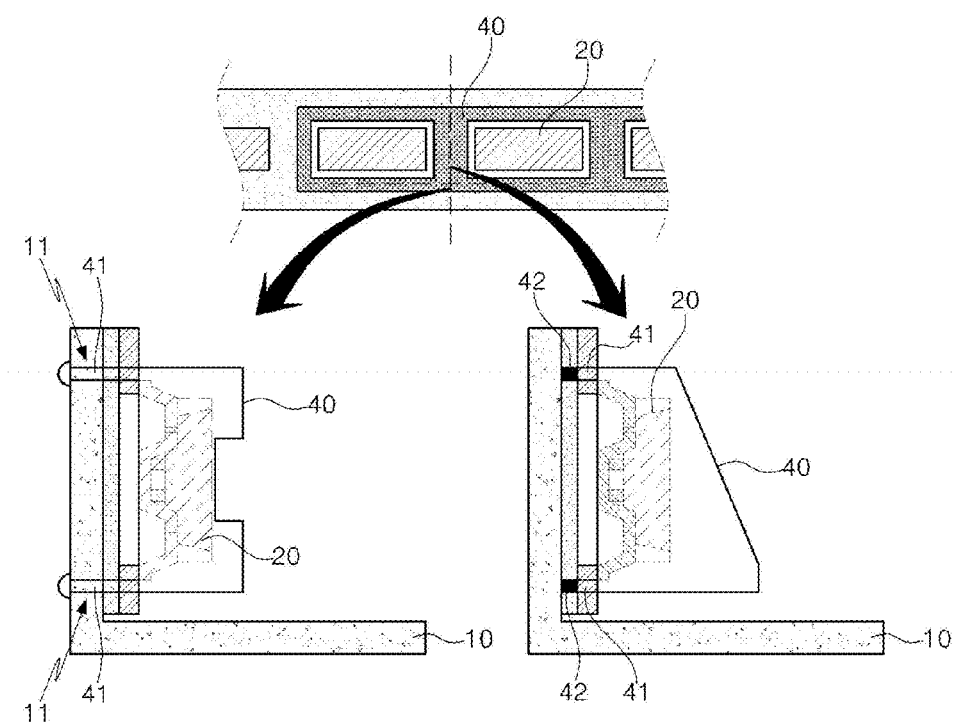

Referring to FIG. 15, the device protection portion 40 may be configured such that a part protruding in a direction of the light emitting surface of the light emitting device 20 is formed in a stepped structure. That is, one surface of the device protection portion 40 toward the light guide plate may be formed in a stepped structure having a height difference, or in a slope structure.

The device protection portion 40 may include a binding portion 41 attached to the support substrate 10 so as to be stably attached to the support substrate 10. For example, the binding portion may be inserted into the support substrate 10 via a binding hole 11 formed in the support substrate 10.

Also, the binding portion 41 may be attached to the support substrate 10 via an adhesive material portion 42 in such a manner that the adhesive material portion 42 is laminated on one surface of the binding portion.

According to another embodiment, a protective layer may be formed on the device protection portion 40 by coating the device protection portion 40 with at least one material of a resin material, a non-conductive material and a material having lower conductivity than that of the support substrate. Since the support substrate 10 is made of Al, Au, Ag, Cr, an organic compound, an inorganic compound, a magnetic material, a conductive material and the like, the device protection portion 40 is formed of a material having lower conductivity than that of the support substrate so as to locally expand slower than the support substrate 10. That is, the device protection portion 40 is provided with the protection layer formed by coating one surface toward the light guide plate or one surface of the part protruding in the direction of the light emitting surface of the light emitting device 20 with at least one material of a resin material, a non-conductive material and a material having lower conductivity than that of the support plate so as to stably protect the light emitting devices without expanding even when heat is generated due to the light guide plate.

Figure 16:
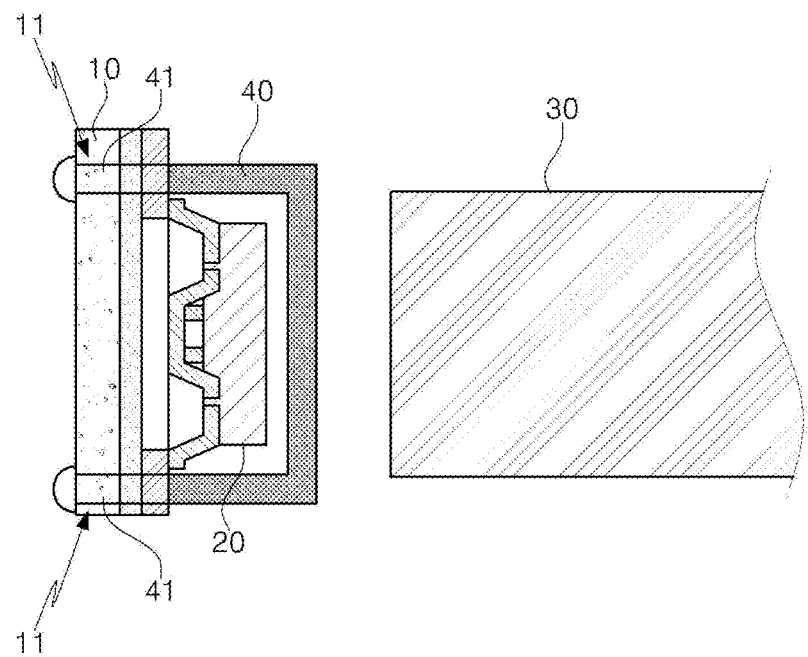
FIGS. 16 and 17 are views illustrating a lighting device according to some embodiments of the present invention.
Figure 17:
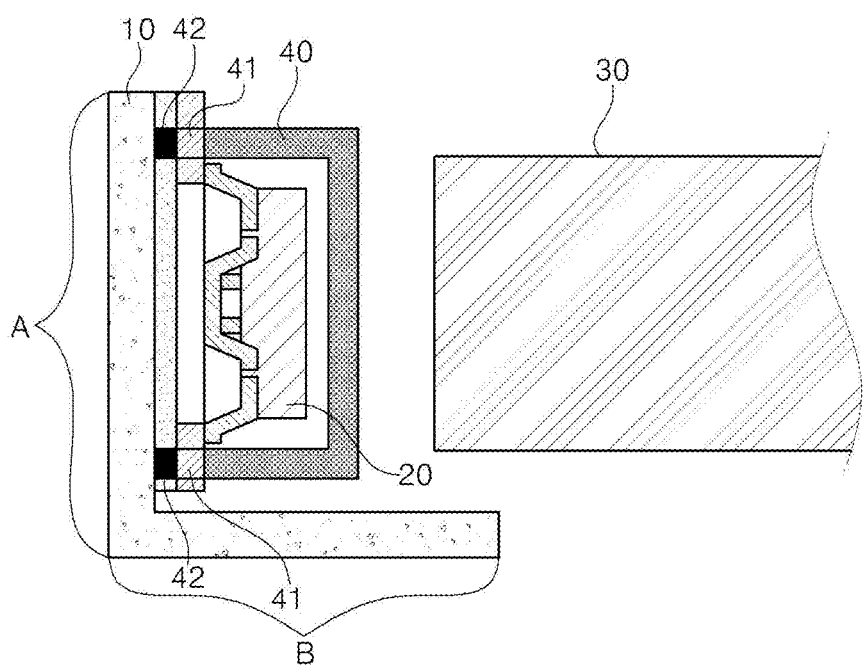

FIGS. 16 and 17 are views illustrating a lighting device according to some embodiments of the present invention.

The lighting device of FIG. 16 shows a circuit board in a bar form, and the lighting device of FIG. 17 shows a bending type circuit board.

The lighting device of FIG. 16 includes: the support substrate 10; the light emitting devices 20; the device protection portion 40 disposed at the periphery of the light emitting devices 20; and the light guide plate 30 disposed to be spaced apart from the device protection portion 40.

Also, the lighting device of FIG. 17 includes: the support substrate 10 including the first region A and the second region B to extend to be bent from the first region A; the light emitting devices 20 mounted on the first region A; the device protection portion 40 disposed at the periphery of the light emitting devices 20; and the light guide plate 30 disposed to be spaced apart from the device protection portion 40.

In this case, the device protection portion 40 may be also configured such that widths of the surfaces are formed to be different from each other, an edge of each of the surfaces is formed in at least one shape of a straight lined shape, a curved shape, a polygonal shape, or a part protruding to the light guide plate 30 is formed in a stepped structure or in a slope structure.

Like the case shown in FIG. 16, the device protection portion 40 may include the binding portion 41 attached to the support substrate 10 so as to be stably attached to the support substrate 10. For example, the binding portion may be inserted into the support substrate 10 via the binding hole 11 formed in the support substrate 10. Also, as shown in FIG. 17, the binding portion 41 may be attached to the support substrate via the adhesive material portion 42 in such a manner that the adhesive material portion 42 is laminated on one surface of the binding portion.

Also, the device protection portion 40 is provided with the protection layer formed by coating one surface toward the light guide plate or one surface of the part protruding in the direction of the light emitting surface of the light emitting device 20 with at least one material of a resin material, a non-conductive material and a material having lower conductivity than that of the support plate so as to stably protect the light emitting devices 20 without expanding even when heat is generated due to the light guide plate 30.

As set forth above, according to some embodiments of the present invention, the circuit board capable of protecting the light emitting devices can be provided by preventing the light guide plate and the light emitting device from coming into contact with each other using the device protection portion in a protruding form.

According to some embodiments of the present invention, the light emitting devices can be effectively protected by forming the surface of the device protection portion protruding to the light guide plate in various shapes, or forming it a stepped structure or a slope structure.

According to some embodiments of the present invention, as the device protection portion is further stably attached to the support substrate via the binding portion, the circuit board capable of protecting the light emitting device from the light guide can be provided.

According to some embodiments of the present invention, in the support substrate including the first region and the second region extending to be bent from the first region, the device protection portion can be formed on the support substrate of any one region of the first region and the second region.

According to some embodiments of the present invention, as the protective layer is formed by coating one surface of the device protection portion with at least one material of a resin material, a non-conductive material and a material having lower conductivity than that of the support substrate, expansion of a device protection portion caused by a light guide plate can be reduced.

As previously described, in the detailed description of the invention, having described the detailed exemplary embodiments of the invention, it should be apparent that modifications and variations can be made by persons skilled without deviating from the spirit or scope of the invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims and their equivalents.

What is claimed is:

1. A circuit board, comprising:
    a support substrate;
    light emitting devices on the support substrate;
    a device protection portion disposed at the periphery of the light emitting devices so as to prevent a light guide plate from coming into contact with the light emitting devices; and
    a protective layer formed on one surface of the device protection portion facing the light guide plate,
    wherein the one surface of the device protection portion facing the light guide plate is formed in a stepped structure comprising a center that is recessed, and
    wherein the protective layer is composed of a material having lower conductivity than that of the support substrate so as to locally expand slower than the support substrate.

2. The circuit board of claim 1, wherein the device protection portion protrudes more than the light emitting devices from the support substrate.

3. The circuit board of claim 1, wherein the device protection portion is formed to surround the light emitting devices.

4. The circuit board of claim 3, wherein the device protection portion is disposed to surround the periphery of the multiple light emitting devices.

5. The circuit board of claim 1, wherein a surface of the device protection portion protruding to the light guide plate has any one shape of a straight lined shape, a curved shape, a circular shape, an elliptical shape and a polygonal shape.

6. The circuit board of claim 1, wherein the device protection portion is disposed in a space between the light emitting devices.

7. The circuit board of claim 1, wherein the device protection portion further comprises a binding portion attached to the support plate.

8. The circuit board of claim 7, further comprising an adhesive material portion disposed between the support substrate and the binding portion.

9. The circuit board of claim 7, further comprising a binding hole formed in the support substrate, wherein the binding portion is attached to the support substrate via the binding hole.

10. The circuit board of claim 1, wherein the support substrate comprises: a first region in which the light emitting devices are disposed; a second region extending from the first region; and a bending portion formed between the first region and the second region.

11. A lighting device, comprising:
a support substrate;
a light emitting device on the support substrate;
a light guide plate;
a device protection portion disposed at the periphery of the light emitting devices so as to prevent the light guide plate from coming into contact with the light emitting devices; and
a protective layer formed on one surface of the device protection portion facing the light guide plate,
wherein the one surface of the device protection portion facing the light guide plate is formed in a stepped structure comprising a center that is recessed, and
wherein the protective layer is composed of a material having lower conductivity than that of the support substrate so as to locally expand slower than the support substrate.

12. The lighting device of claim 11, wherein the device protection portion protrudes more than the light emitting devices from the support substrate.

13. The lighting device of claim 11, wherein the device protection portion is formed to surround the light emitting devices.

14. The lighting device of claim 13, wherein the device protection portion is disposed to surround the periphery of the multiple light emitting devices.

15. The lighting device of claim 11, wherein a surface of the device protection portion protruding to the light guide plate has any one shape of a straight lined shape, a curved shape, a circular shape, an elliptical shape and a polygonal shape.

16. The lighting device of claim 11, wherein the device protection portion is disposed in a space between the light emitting devices.

* * * * *